2,824,109

PROCESS FOR THE PRODUCTION OF 4-AMINO-PHTHAL-IMIDE-5-SULFONIC ACID

Berthold Bienert and Fritz Baumann, Leverkusen-Bayerwerk, and Heinrich Vollmann, Leverkusen, Germany, assignors to Farbenfabriken Bayer Aktiengesellschaft, Leverkusen, Germany, a corporation of Germany No Drawing. Application August 5, 1954
Serial No. 448,138

Claims priority, application Germany August 7, 1953

3 Claims. (Cl. 260—326)

This invention relates to a new intermediate for the synthesis of phthalocyanine dyestuffs and to a process of preparing the same.

It is known that phthalic acid and derivatives thereof may be used as starting materials for the production of phthalocyanine dyestuffs. The phthalocyanine dyestuffs thus obtained have the disadvantage to be insoluble in the conventional solvents.

It is an object of the present invention to provide a new derivative of phthalic acid which may be used as starting material for new substantive phthalocyanine dyestuffs. Another object is to provide a commercially feasible process for the production of this new phthalic acid derivative.

These objects are attained in accordance with the present invention by reacting 4-amino-phthalimide with a sulfonating agent and recovering the 4-amino-phthalimide-5-sulfonic acid thus obtained.

The reaction underlying the process of the invention may be represented by the following equation:

This reaction is most surprising since phthalic acid and phthalic anhydride may be sulfonated only under severe reaction conditions and 4-amino-phthalic acid is very easily decarboxylated at higher temperatures.

The 4-amino-phthalimide serving as the starting material may easily be obtained by nitration of phthalimide and reduction of the resultant 4-nitrophthalimide by known methods.

Among the sulfonating agents which may be used for the process of the invention are concentrated sulfuric acid, 100% sulfuric acid, oleum and chlorosulfonic acid, the latter being particularly suitable.

In practising the invention, the 4-amino-phthalimide is preferably dissolved in an inert organic diluent, as for example nitrobenzene, o-dichlorobenzene or tri-chlorobenzene, and the sulfonating agent is then added to the solution. The reaction is advantageously carried out at elevated temperature, temperatures ranging from about 100° to about 200° C. being most satisfactory. From the reaction mixture 4-amino-phthalimide-5-sulfonic acid precipitates in the form of an insoluble inner salt which may be used as such or converted to the sodium salt.

The invention is further illustrated by the following typical example of a specific embodiment thereof, all parts being by weight.

Example 39.7 parts of chlorosulfonic acid are added dropwise to a suspension of
50.4 parts of 4-amino-phthalimide in
278 parts of nitrobenzene
at a temperature of 120–130° C. while stirring. Stirring is then continued for another 6 hours at a temperature of 140° C. In order to complete the reaction 2 portions of 12.7 parts and 1 portion of 6.35 parts of chlorosulfonic acid are added at intervals while stirring after each addition for another 4 hours at a temperature of 140° C.

The precipitated colorless or light-grey inner salt of 4-amino-phthalimide-5-sulfonic acid may be obtained either by evaporating the nitrobenzene from the reaction mixture in vacuo or by sucking off the salt and washing it with benzene.

To obtain the sodium salt the crude product is suspended in 256 parts of cold water and neutralized with 24.8 parts of soda. By addition of 64 parts of sodium chloride the yellow sodium salt of the 4-amino-phthalimide-5-sulfonic acid is precipitated. It is sucked off, washed with saturated sodium chloride solution and dried.

The suspension of the inner salt of 4-amino-phthalimide-5-sulfonic acid may be also worked up by introducing the mixture into 800 parts of ice water while stirring and slowly neutralizing the cold solution with about 63.5 parts of concentrated ammonia (25%). The mixture is then heated to 50° C., the aqueous layer, which contains the 4-amino-phthalimide-5-sulfonic acid, is separated from the nitrobenzene, and filtered with activated carbon. The sodium salt of the sulfonic acid is then precipitated by addition of 240 parts of sodium chloride.

The crude sodium salt may contain small amounts of 4-amino-phthalimide which can be removed by heating the salt with pyridine or acetone. For a complete purification the crude sodium salt is dissolved in 10 parts of hot water, treated with activated carbon and filtered. Upon adding 2.5 parts of sodium chloride the filtrate is stirred until cold. The sodium salt of 4-amino-phthalimide-5-sulfonic acid is sucked off, washed with saturated sodium chloride solution and dried. It is obtained in bright yellow needles along with sodium chloride, and may be very easily diazotized or converted to the corresponding acylamino derivatives. It is a useful intermediate product for the synthesis of dyestuffs.

Obviously many modifications and variations of the invention as hereinbefore set forth may be made without departing from the spirit and scope thereof, and therefore only such limitations should be imposed as are indicated in the appended claims.

We claim:

1. 4-amino-phthalimide-5-sulfonic acid.

2. Process for the production of 4-amino-phthalimide-5-sulfonic acid which comprises sulfonating 4-amino-phthalimide with a sulfonating agent selected from the group consisting of concentrated sulfuric acid, 100% sulfuric acid, oleum and chlorosulfonic acid at a temperature ranging from about 100° to 200° C., and recovering 4-amino-phthalimide-5-sulfonic acid from the reaction mixture.

3. Process in accordance with claim 2, in which said sulfonation is carried out in an inert diluent at a temperature ranging from about 100° to about 200° C.

References Cited in the file of this patent

UNITED STATES PATENTS

| | | |
|---|---|---|
| 2,211,947 | Heilbron et al. | Aug. 20, 1940 |
| 2,273,444 | Koeberle et al. | Feb. 17, 1942 |
| 2,430,231 | Lacey et al. | Nov. 4, 1947 |
| 2,436,362 | Lacey et al. | Feb. 17, 1948 |